W. ALTPETER.
CURTAIN FASTENER.
APPLICATION FILED MAR. 9, 1918.
1,304,527.
Patented May 27, 1919.
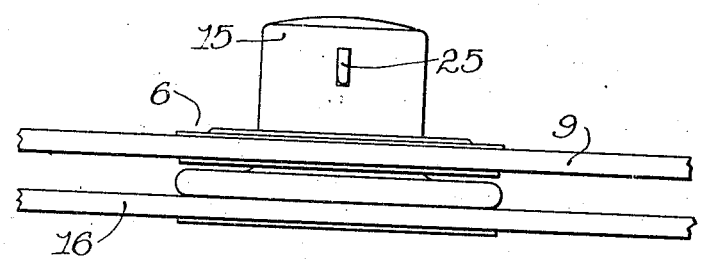
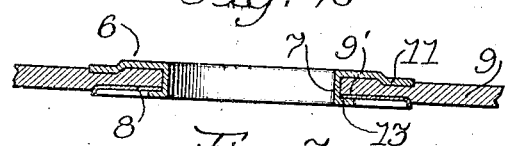
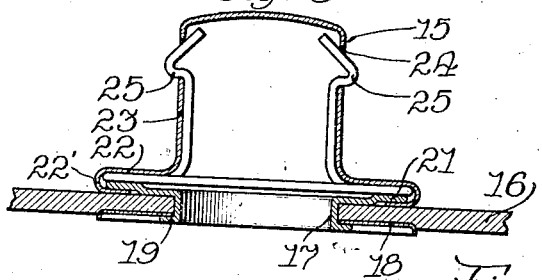
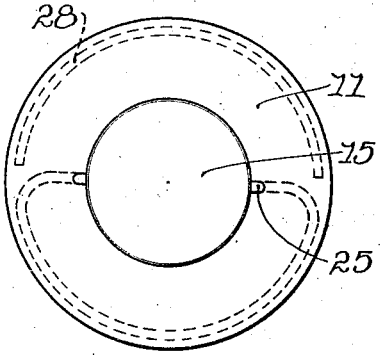
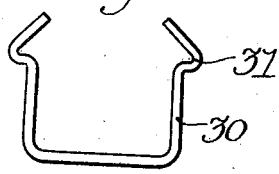
Inventor
Walter Altpeter
By Brown Hauser & Boettcher
Attorneys

UNITED STATES PATENT OFFICE.

WALTER ALTPETER, OF CHICAGO, ILLINOIS, ASSIGNOR OF ONE-THIRD TO EDWARD SMET, OF CHICAGO, ILLINOIS, AND ONE-THIRD TO FRANCIS E. EDWARDS, OF CRYSTAL LAKE, ILLINOIS.

CURTAIN-FASTENER.

1,304,527.  Specification of Letters Patent.  Patented May 27, 1919.

Application filed March 9, 1918. Serial No. 221,370.

*To all whom it may concern:*

Be it known that I, WALTER ALTPETER, a citizen of the United States, residing at Chicago, in the county of Cook and State of Illinois, have invented a certain new and useful Improvement in Curtain-Fasteners, of which the following is a full, clear, concise, and exact description, reference being had to the accompanying drawings, forming a part of this specification.

The present invention relates to curtain fasteners.

My improved fastener is intended particularly for use on automobile and carriage curtains. Its utility, however, is not confined to this particular use, as it may be variously employed for fastening awnings, tents, gloves, cartridge belts, tire covers, boots, for folding tops, etc.

The particular object of the invention is to provide a secure fastening device which can be readily engaged and released. The elements of the fastener comprise a gromet secured in one member and a stud secured to the other, novel spring detent means in the stud preventing accidental disengagement of the two.

The fastening of the device can be accomplished with ease and rapidity by merely thrusting the gromet over the stud of the fastener. There are no parts to be revolved, removed nor otherwise manipulated to perform this operation. When thus fastened the device is proof against accidental release through straining or flapping of the curtains or the like.

To release the fastener the gromet is simply pulled straight off the end of the stud. The lateral pull incident in the straining and flapping of the curtains or the like, is the factor that makes the accidental release of the fastener impossible.

My improved fastener is characterized by a simple, sturdy and inexpensive construction. This construction will be better understood by reference to the following detailed specification, taken in connection with the accompanying drawing in which Figure 1 is an elevational view of the gromet and stud in fastened relation.

Fig. 2 is a sectional view of the gromet alone.

Fig. 3 is a sectional view of the stud alone.

Fig. 4 is a plan view of the stud, and

Fig. 5 is an isolated view of a modified form of spring detent.

It will be understood that these views are drawn to an enlarged scale to illustrate the details of the fastener.

The gromet 6 comprises an eyelet 7 and washer 8 suitably curled together through an opening in the body or fly of the curtain 9. The upper face of the eyelet 7 has its rim creased into the fabric of the curtain as shown at 11.

The rim of the washer 8 is slightly curled, as shown at 12, to prevent cutting and chafing of the curtain 9. The cylindrical shank of the eyelet 7 extends through the hole in the washer 8 and is curled over the edges thereof as shown at 13. This curling operation presses the washer 8 up into the fabric of the curtain 9, thereby compressing the material directly beneath the crease 11 and preventing the thicker portion $9^1$, encircling the eyelet shank, from being torn out from between the eyelet and washer.

The stud 15 of the fastener is secured to the other curtain 16 by a similar eyelet 17 and washer 18. The shank of the eyelet 17 is curled over the edge of the hole in the washer 18, as shown at 19.

The upper face of the eyelet 17 has a raised rim 21 between which, and the body of the curtain 16, is confined the inwardly turned edge $22^1$ of the flange 22. This flange forms a base and also an attaching medium for the cylindrical shell 23.

The shell 23 is closed at the top, and has slotted openings 24—24, at diametrically opposite points in its shank portion, for the projection of the spring humps 25. These spring humps are formed in a spring inclosed within the shell.

This spring comprises the semi-circular loop 26 and the perpendicular extensions 27—27, in the ends of which are formed the humps 25. The semi-circular loop 26 rests upon the raised rim 21 of the eyelet, the curled circumference of the flange 22 being stamped down upon the two. A semi-circular filler wire 28 (Fig. 4) is provided for filling the other half of the curled circumference $22^1$, of the flange 22.

The humps 25 are formed by sharply bending the extensions 27 to form a right angle shoulder and then diagonally re-bending the wire to form an oblique upper edge of the hump. The oblique edge facilitates insertion of the stud 15 to the gromet 6 by camming the hump into the interior of the shell. The shoulders 25¹ do not afford such effective camming surfaces for depressing the humps and hence when the gromet is in place there is slight possibility of its accidentally working off the end of the stud. The stud 15 fits snugly within the gromet 6 and cannot be released therefrom when the pull is at all lateral or biased. But by grasping the curtain upon opposite sides of the gromet and withdrawing the gromet straight from the stud, there is no difficulty encountered in releasing the fastener.

The humps 25 can be formed with oblique upper and lower surfaces if desired.

The modified form of spring, illustrated in Fig. 5, is shaped similarly to a hairpin. The humps 31 are never depressed farther than just within the confines of the slots 24 in the shell, and thus the spring 30 will always remain suspended from the slots.

All of the various parts of the fastener are preferably constructed of brass or are nickel-plated to prevent rusting.

It will be apparent that in addition to its improved operation, my fastener is featured by simplicity, durability and low cost of manufacture.

I claim:

1. In a fastener for curtains and the like, a stud member comprising a shell, a flange on said shell, a detent spring within said shell, an eyelet in one of the curtains, said flange and said eyelet being curled together, said spring being confined between its ends between said flange and said eyelet and secured thereby.

2. In a fastener for curtains and the like, a stud member comprising a shell, a flange on said shell, a detent spring within said shell, said spring having a looped portion between its ends, an eyelet in one of the curtains, the circumference of said flange being curled over the edge of said eyelet upon the looped portion of said spring therebetween and securing the spring in position.

3. In a fastener for curtains and the like, a stud member comprising a hollow cylindrical shell, a radial flange at the open end of said shell, a detent spring confined within said shell and secured beneath said flange, the ends of the spring extending longitudinally through the shell and provided at their free ends with humps projecting through openings in said shell, and means for fastening said stud member to a curtain.

4. In a fastener for curtains and the like, a gromet, a stud member, said stud member adapted to pass through said gromet, said gromet comprising an eyelet and a washer, the shank portion of said eyelet being curled over said washer, a radial flange on said eyelet, said radial flange being parallel with said washer and creased into the curtain.

5. In a curtain fastener, a stud for use with a gromet, the stud comprising a shell, a flange on the shell, a detent spring within the shell, said spring having a substantially semi-circular looped portion, an eyelet in the curtain, the circumference of the shell flange curled over the edge of said eyelet upon said looped portion of the spring therebetween, and a substantially semi-circular filler wire confined between the flange and the eyelet opposite to said looped portion.

6. In a curtain fastener, a stud member, spring humps projecting from the sides of the stem adjacent to its free end, and a gromet relatively thin adapted to slide on the stud, the gromet having a straight hole fitting the stud closely and being adapted to bind the stud when subjected to any but a pull axially in line with the stud.

In witness whereof I hereunto subscribe my name this 16th day of February, A. D. 1918.

WALTER ALTPETER.